(12) United States Patent
Frierson

(10) Patent No.: US 11,095,104 B2
(45) Date of Patent: Aug. 17, 2021

(54) CHORD ORGANIZER

(71) Applicant: Harvey L Frierson, Mathews, NC (US)

(72) Inventor: Harvey L Frierson, Mathews, NC (US)

( * ) Notice: Subject to any disclaimer, the term of this patent is extended or adjusted under 35 U.S.C. 154(b) by 0 days.

(21) Appl. No.: 15/587,458

(22) Filed: May 5, 2017

(65) Prior Publication Data
US 2018/0319619 A1 Nov. 8, 2018

(51) Int. Cl.
H02G 3/04 (2006.01)
B65H 75/36 (2006.01)
H02G 11/00 (2006.01)
H02G 3/32 (2006.01)
H02G 3/30 (2006.01)

(52) U.S. Cl.
CPC .......... *H02G 3/0431* (2013.01); *B65H 75/36* (2013.01); *H02G 3/305* (2013.01); *H02G 3/32* (2013.01); *H02G 11/00* (2013.01); *B65H 2701/34* (2013.01); *H02G 3/30* (2013.01)

(58) Field of Classification Search
CPC .......... H02G 3/32; H02G 3/0431; H02G 3/30; H02G 3/305
See application file for complete search history.

(56) References Cited

U.S. PATENT DOCUMENTS

| 3,059,645 | A | * | 10/1962 | Hasbrouck | A61M 25/02 128/DIG. 26 |
| 3,170,612 | A | * | 2/1965 | Blumenschein | B25H 3/04 294/143 |
| 3,696,920 | A | * | 10/1972 | Lahay | A61B 50/20 206/370 |
| 4,397,647 | A | * | 8/1983 | Gordon | A61M 25/02 128/DIG. 26 |
| 4,579,310 | A | * | 4/1986 | Wells | H04M 1/0293 248/544 |
| 4,971,271 | A | * | 11/1990 | Sularz | A61M 5/1418 248/229.13 |
| 5,043,746 | A | * | 8/1991 | Abe | 248/68.1 |
| 5,224,674 | A | * | 7/1993 | Simons | F16L 3/2235 248/68.1 |
| 5,226,892 | A | * | 7/1993 | Boswell | A61M 5/1418 128/DIG. 26 |

(Continued)

FOREIGN PATENT DOCUMENTS

| FR | 726081 | A | * | 5/1932 | ........... H02G 3/0431 |
| FR | 1310694 | A | * | 11/1962 | ........... H02G 3/0431 |

(Continued)

*Primary Examiner* — Eret C McNichols
(74) *Attorney, Agent, or Firm* — F Rhett Brockington

(57) ABSTRACT

A cord organizer has a flexural board with a back, a front, a width, a length and a thickness. A frontal surface has rectangular facets separated by open-ended elongate slots, and each open-ended elongate slot is coextensive with an open-ended elongate chamber forming a cord retainer, which is recessed within the thickness. When the flexural board is angularly flexed the rectangular facets fan out and each of the open-ended elongate slots are widened, therein widening access to each of the open-ended elongate chambers; and while widened the cord retainers are individually fitted with a sectional length of a cord. When the flexural board is released it returns to its relaxed state, wherein the cord retainers envelop and restrain each of the cords on the flexural board.

12 Claims, 15 Drawing Sheets

(56) References Cited

U.S. PATENT DOCUMENTS

| | | | | |
|---|---|---|---|---|
| 5,334,186 | A * | 8/1994 | Alexander | A61M 5/1418 128/DIG. 15 |
| 5,336,179 | A * | 8/1994 | Ryan | A61M 5/1418 128/DIG. 26 |
| 5,530,786 | A * | 6/1996 | Radliff | G02B 6/3801 385/136 |
| 5,590,234 | A * | 12/1996 | Pulido | G02B 6/4471 385/135 |
| D378,408 | S * | 3/1997 | Pyeatt | D24/128 |
| 5,643,217 | A * | 7/1997 | Dobkin | A61B 17/00 604/174 |
| 5,862,291 | A * | 1/1999 | Stockman | G02B 6/4471 385/136 |
| 6,012,940 | A * | 1/2000 | Wheeler | H01R 13/6392 439/369 |
| 6,249,636 | B1 * | 6/2001 | Daoud | G02B 6/4471 385/135 |
| 6,360,051 | B1 * | 3/2002 | Daoud | G02B 6/3801 385/134 |
| 6,370,309 | B1 * | 4/2002 | Daoud | G02B 6/3801 385/135 |
| 6,458,104 | B2 * | 10/2002 | Gautsche | A61M 5/1418 128/DIG. 26 |
| D488,054 | S * | 4/2004 | Myers | D8/356 |
| 6,801,704 | B1 * | 10/2004 | Daoud | G02B 6/4471 385/134 |
| 7,139,462 | B1 * | 11/2006 | Richtman | G02B 6/4471 385/137 |
| 7,303,568 | B2 * | 12/2007 | Jannot | A61B 17/06061 606/148 |
| 7,320,681 | B2 * | 1/2008 | Gillis | A61M 25/02 128/DIG. 26 |
| 7,394,963 | B2 * | 7/2008 | Hartlef | G02B 6/4471 385/134 |
| D587,102 | S * | 2/2009 | Morgan | D8/356 |
| 7,514,630 | B2 * | 4/2009 | Anderson | H02G 3/30 174/135 |
| D630,317 | S * | 1/2011 | Wung | D24/128 |
| D644,501 | S * | 9/2011 | Chen | D8/356 |
| 8,052,648 | B2 * | 11/2011 | Dikeman | A61M 25/02 604/174 |
| D657,869 | S * | 4/2012 | Mammen | D24/128 |
| 8,342,459 | B2 * | 1/2013 | Garrison | H01R 12/63 248/316.7 |
| 8,523,824 | B2 * | 9/2013 | Teirstein | A61M 25/02 604/174 |
| 8,998,151 | B2 | 4/2015 | Hoek | |
| 9,207,422 | B2 * | 12/2015 | Ray | G02B 6/4454 |
| D774,002 | S | 12/2016 | Hsieh | |
| 9,618,143 | B2 * | 4/2017 | Noble | F16L 3/24 |
| 9,698,529 | B1 * | 7/2017 | Schow | H01R 13/635 |
| 9,849,227 | B2 * | 12/2017 | Klewinghaus | A61M 1/3621 |
| 2003/0132352 | A1 * | 7/2003 | Weaver | A61G 7/0503 248/68.1 |
| 2004/0118982 | A1 * | 6/2004 | Shillings | F16L 3/223 248/68.1 |
| 2005/0120652 | A1 * | 6/2005 | Cacciani | F16L 3/13 52/302.1 |
| 2007/0235597 | A1 * | 10/2007 | Winchester | F16L 3/223 248/68.1 |
| 2009/0065249 | A1 * | 3/2009 | Silvers | H02G 3/30 174/72 A |
| 2009/0293233 | A1 * | 12/2009 | Ho | F16L 3/222 24/129 R |
| 2010/0132979 | A1 | 6/2010 | Chen | |
| 2015/0089774 | A1 * | 4/2015 | Kalejaiye | H02G 3/32 24/122.3 |
| 2015/0270694 | A1 * | 9/2015 | Bailey | H02G 3/30 174/156 |
| 2018/0319619 | A1 * | 11/2018 | Frierson | H02G 3/0431 |

FOREIGN PATENT DOCUMENTS

| | | | | |
|---|---|---|---|---|
| GB | | 881847 A | * 11/1961 | H02G 3/0431 |
| JP | | 05080225 A | * 4/1993 | |
| KR | 1020170074913 | | * 6/2017 | |
| WO | WO-2005049410 A1 | | * 6/2005 | B62D 25/145 |

* cited by examiner

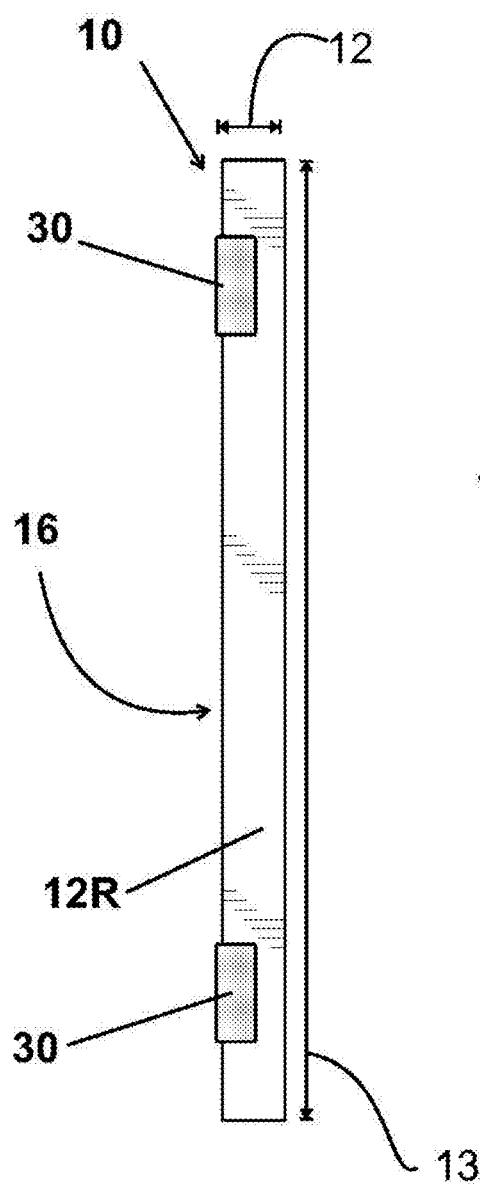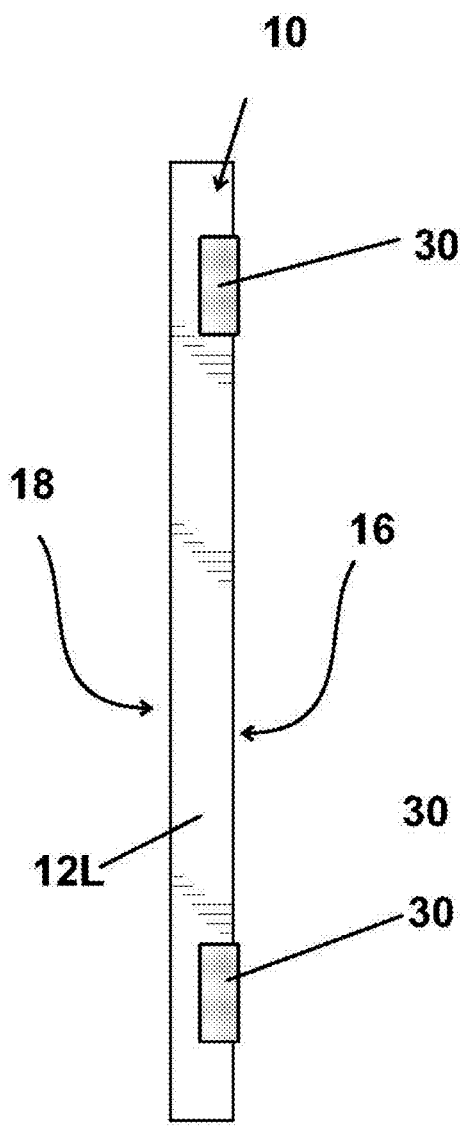
*FIG. 4*     *FIG. 5*

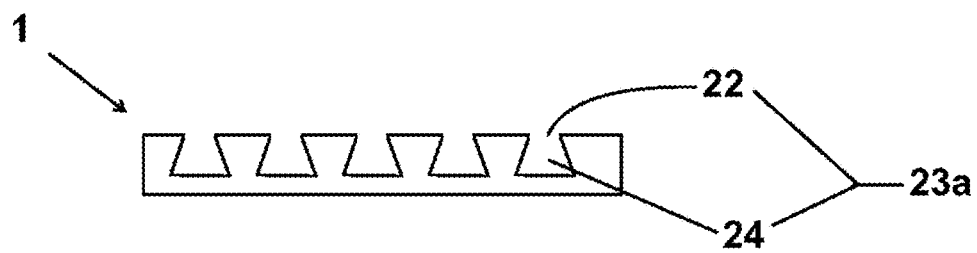
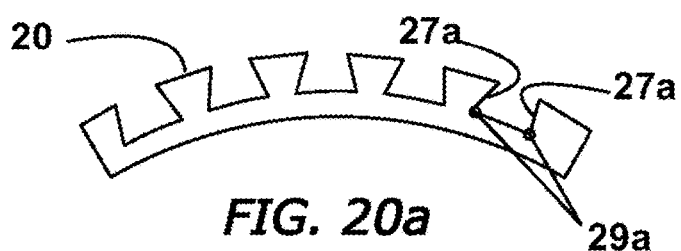
FIG. 20a
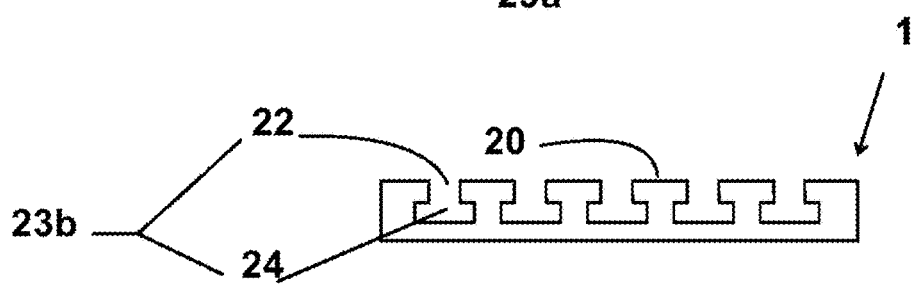
FIG. 20b
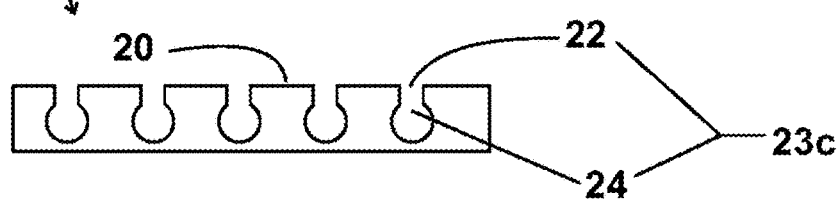
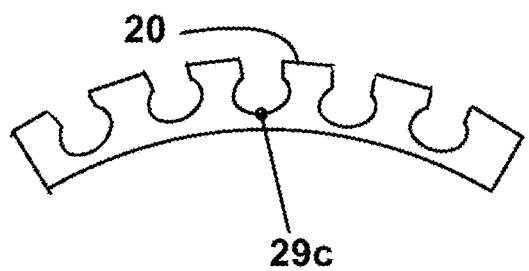
FIG. 20c

CHORD ORGANIZER

BACKGROUND OF THE INVENTION

1. Field of the Invention

The invention relates generally to an apparatus for organizing cords, wherein the organized cords are isolated in parallel open-ended elongate chambers, and a plurality of sections of a long cord can be organized into looped sections on one or more cord organizers.

2. Background

Barber/stylist have a plurality of sizes of clippers, where each size is specialized for a certain type of cut; and where often each size has a backup hair clipper. When being used a hair clipper is periodically set down, typically quickly and casually, so that the barber/stylist can move onto another step. Over a fairly short, period of time the cords of the various clippers become twisted, entangled and mingled with each other to a point where when trying to use another size clipper, the barber/stylist will pick up a plurality of cords connected to other clippers, as cords of the plurality of clippers have become entangled. The problem is aggravated by the fact that cords on most clippers are longer than the barber/stylist normally needs, and unused lengths of cord—tend to become intertwined. What is needed is a cord organizer that not only separates cord, but has the capability of shortening and lengthening a cord as needed.

SUMMARY OF THE INVENTION

A first object of the invention is a cord organizer that provides for separating cords and enables multiple sectional lengths of the cord to be organized on the cord organizer.

A second object of the invention is that the cord organizer provides electrical isolation between cords.

A third object of the invention is to provide a cord organizer that is durable, and resistant to chemicals used by a barber/stylist.

A fourth object of the invention is that the cord organizer can be combined with another cord organizer.

A fifth object of the invention is that the cord organizer can used be on the floor, in a cabinet, on a wall, and oriented either horizontally or vertically or any angle between.

BRIEF DESCRIPTION OF THE DRAWINGS

The foregoing invention will become readily apparent by referring to the following detailed description and the appended drawings in which:

FIG. 4 and FIG. 5 illustrate opposing side edges of the of the cord organizer shown in FIG. 1, wherein the viewer can view a relative perspective of the thickness of the flexural board;

FIG. 20a, FIG. 20b and FIG. 20c are end-on views illustrating various embodiments of the invented cord organizer, both flat and flexed, wherein the various embodiments respectively have dovetail cord retainers, T-slot cord retainers and keyhole cord retainers.

DETAILED DESCRIPTION OF THE INVENTION

A cord organizer that includes a flexural board with a back, a front, a left edge, a right edge, a top edge, a bottom edge, a width, a length and a thickness, wherein the flexural board is substantially flat when not flexed. A frontal surface has rectangular facets separated by slots, and each slot is open-ended and elongate, where each of the slots is coextensive with an open-ended elongate chamber, which is recessed within the thickness of the flexural board. A combined open-ended elongate slot and coextensive open-ended elongate chamber form a cord retainer. When the flexural board is angularly flexed from a relaxed state, the left edge and the right edge arced toward the back, therein causing the rectangular facets to fan out causing the slots to widen lengthwise on the flexural board; and while the slots are widened the cord retainers are more accessible and can be fitted with one or more sectional lengths of a cord. Typically, fitting the cord retainer with a length of cord is effected by pressing an extended section of cord through a widened entrance of the slot into the open-ended elongate chamber, and then pulling the cord taut. When not arced the rectangular facets are not fanned out the slots return to their unwidened size.

After the required number of cord retainers is filled, the flexural board is relaxed, and it returns to the relaxed state, wherein the open-ended elongate chambers envelop and restrain each of the one or more sectional lengths of individual cords within the flexural board.

Figure 1:
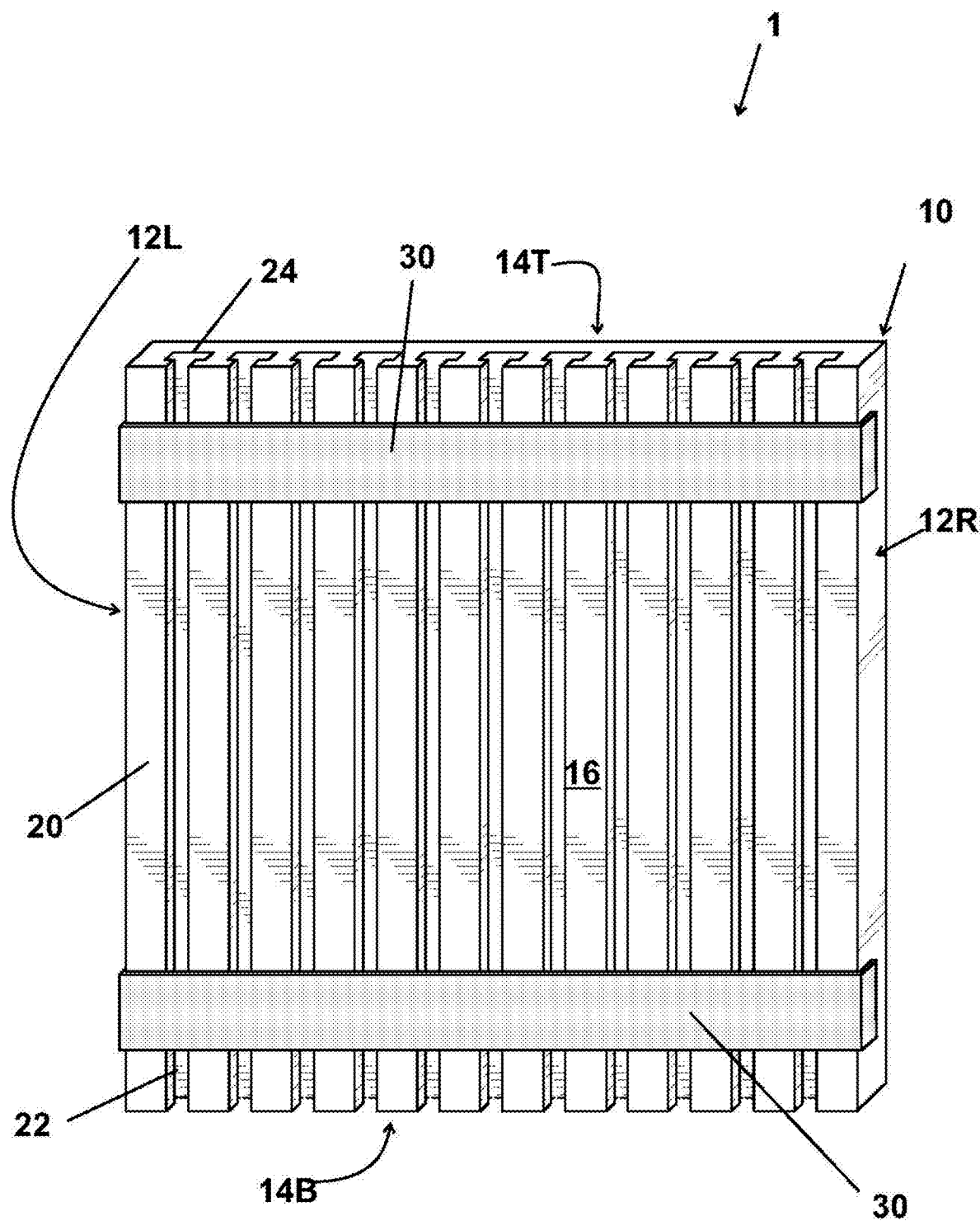
FIG. 1 is a perspective overhead frontal view of a cord organizer that is currently empty, wherein the cord organizer is a flexural board with a frontal surface having rectangular facets separated by open-ended elongate slots, wherein each open-ended elongate slot is coextensive with an open-ended elongate chamber and function together as a cord retainer, wherein spanning the frontal surface is at least one elastic band.

As illustrated in FIG. 1 the cord organizer 1 is a flexural board 10 with a frontal surface 16 with rectangular facets 20 separated by open-ended elongate slots 22, each slot 22 is coextensive with an open-ended elongate chamber 24. The illustrated cord organizer 1 has eleven open-ended elongate slots 22 and eleven open-ended elongate chambers 24. There are a total of twelve rectangular facets 20, but only ten are bounded on both-sides by the open-ended elongate slots 22. In this embodiment the frontal surface 16 of the flexural board 10 has two elastic bands 30, wherein a first elastic band 30 is proximate to a top edge 12T, and a second elastic band 30 is proximate to a bottom edge 12B of the flexural board 10. Both bands wrap the frontal surface 16 and are attached to the right edge 12R and the left edge 12L. The bands 30 are tensioned; pulling the right edge 12R and the left edge 12L of the flexural board 10 forward, out-of-the plane of the page.

Figure 2:
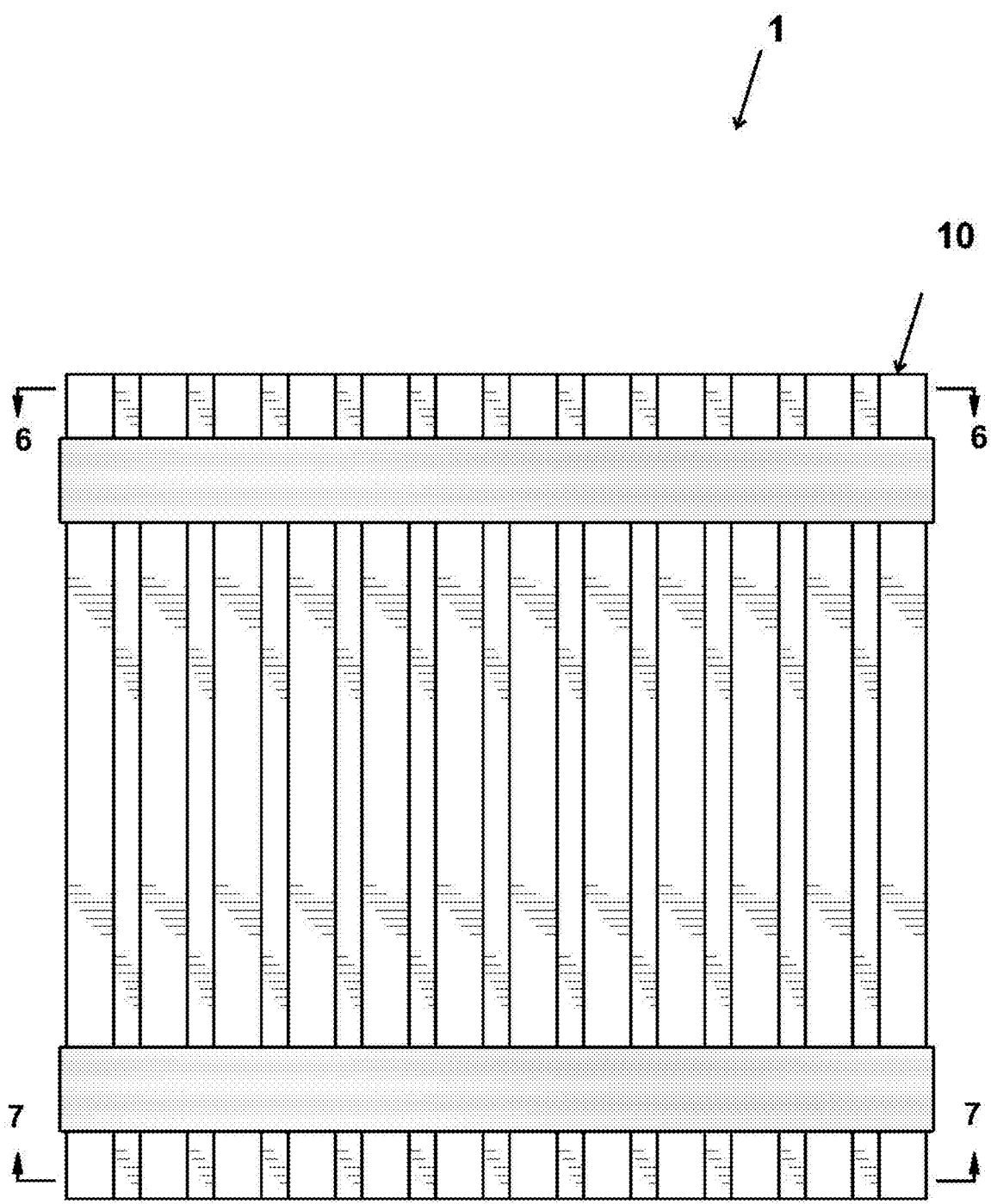
FIG. 2 is a plan overhead view of the front of the cord organizer shown in FIG. 1, illustrating a cross-sectional sectional line 6-6, and a cross-sectional sectional line 7-7.

FIG. 2 is a plan view of the cord organizer 1 shown in FIG. 1, illustrating the cross-sectional cut of sectional line 6-6, and the cross-sectional cut of sectional line 7-7 taken through the flexural board 10.

Figure 3:
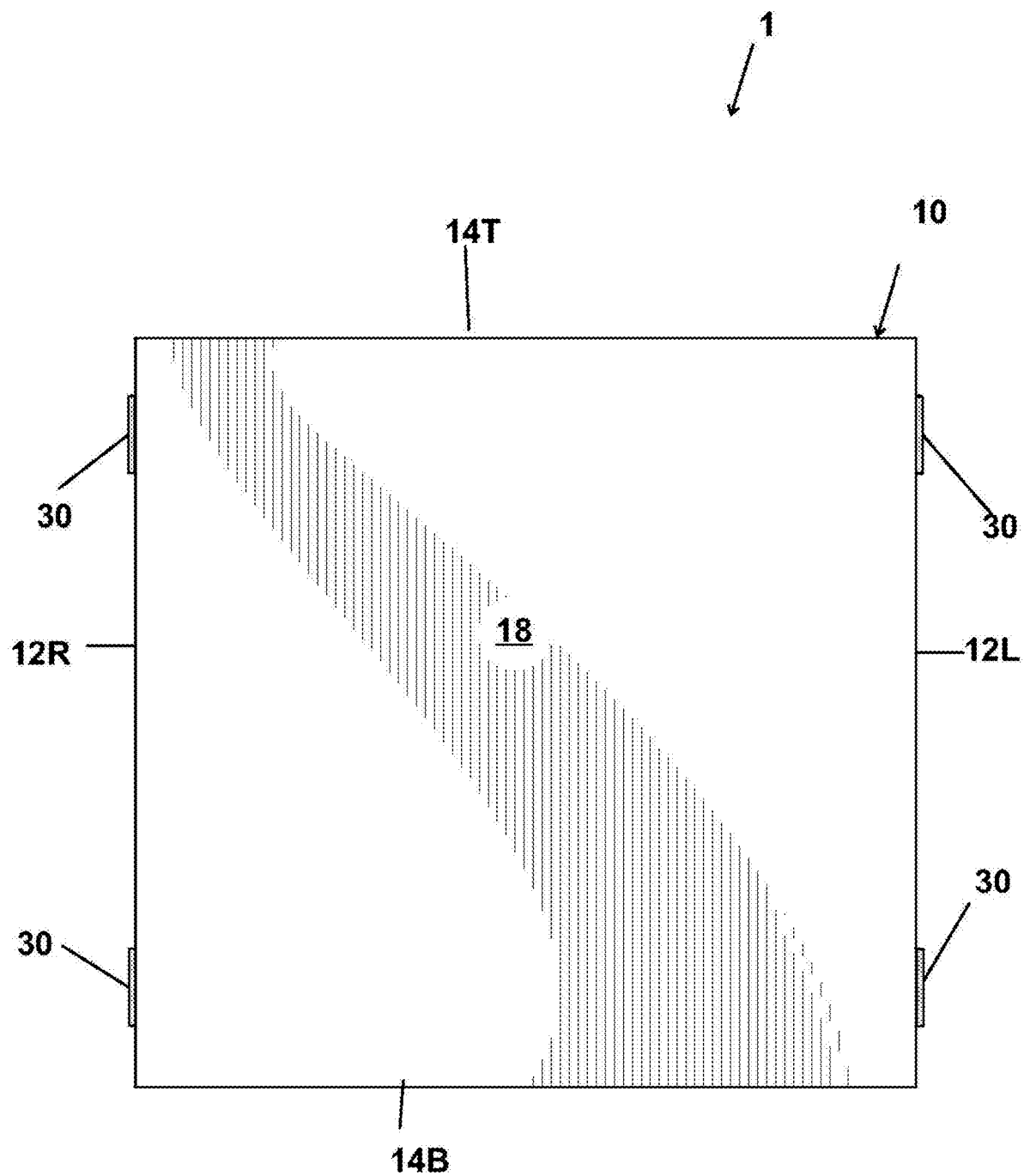
FIG. 3 is a plan overhead view of the back of the cord organizer shown in FIG. 1.

The back 18 of the cord organizer 1 is illustrated in FIG. 3. Ends of the elastic bands 30 are attached to the right edge 12R and the left edge 12L. The edges are reversed because the flexural board 10 has been flipped over, rotated around a vertical axis, so that the edges shown in FIG. 1 are now on the opposite sides.

Figure 6:
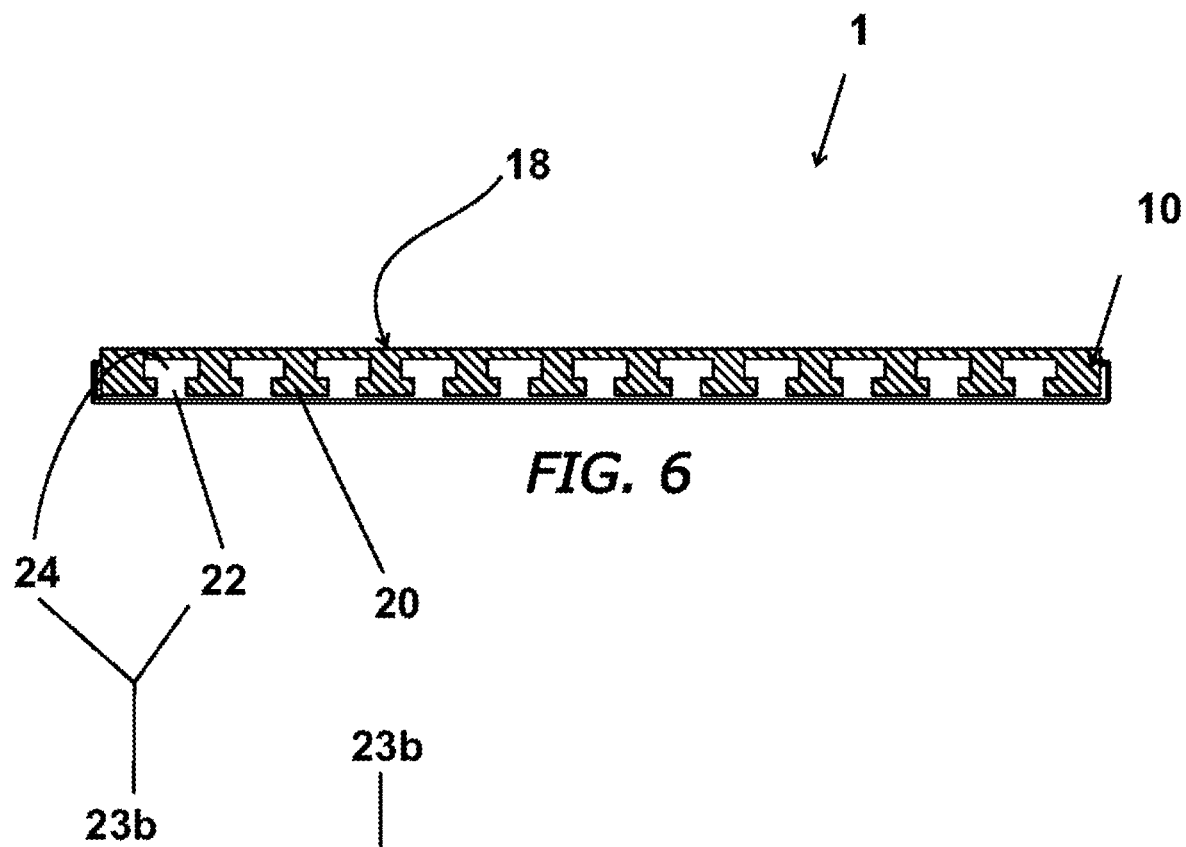
FIG. 6 illustrates a cross-sectional cut along sectional line 6-6 shown in FIG. 2 of the cord organizer, wherein the flexural board has a plurality of T-Slot cord retainers separated by rectangular facets.
Figure 7:
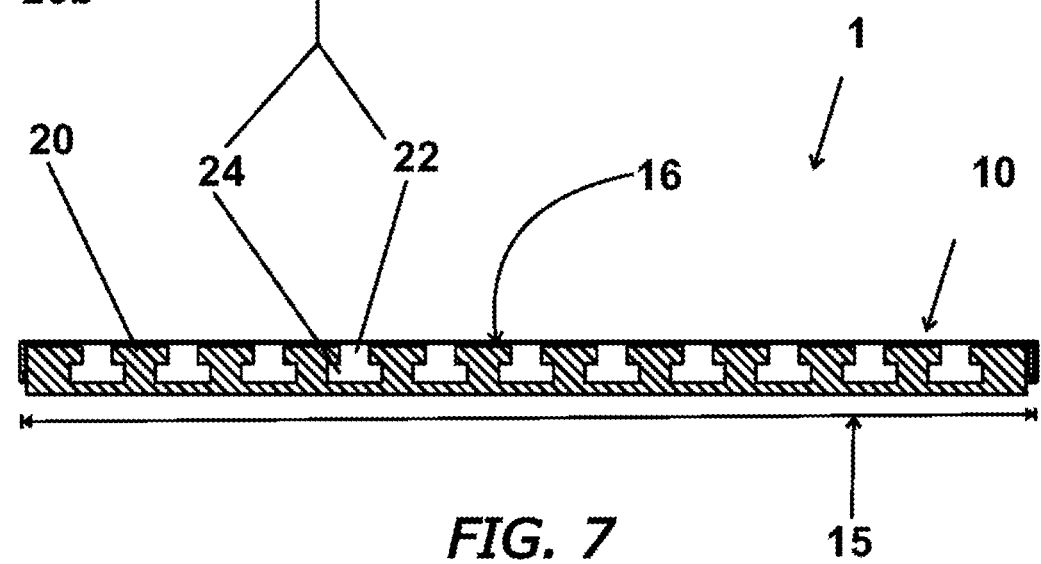
FIG. 7 illustrates a cross-sectional cut along sectional line 7-7 shown in FIG. 2 of the cord organizer, wherein the flexural board has a plurality of T-Slot cord retainers separated by rectangular facets.

The reader can glean some relative perspective of the thickness 28 of the flexural board 10, however the thickness, the length, and the width are not limiting, but the thickness is limited in that the thickness has to accommodate the open-ended elongate slots 22 and the open-ended elongate chambers 24 (as shown in FIG. 6 and FIG. 7). In the drawings, the thickness 12 of the right edge 12R in FIG. 4 and the left edge 12L in FIG. 5 is about 0.3 inches, and the width is about 5 inches, which is a thickness to width ratio of 1:16.5. The length 15, as shown in FIG. 6 and FIG. 7, is about 5.25 inches, so the thickness to width ratio is about 1:17.5. It is anticipated that the flexural board 10 can be narrower in width and longer in length enable to accommodate more cords in the same square area.

A combined open-ended elongate slot and coextensive open-ended elongate chamber form the cord retainer. In FIG. 6 and FIG. 7 the open-ended elongate slot 22 is coextensive with an open-ended elongate chamber 24 that is rectangular, there forming a T-Slot cord retainer 23b. Each T-Slot cord retainer 23b is separated by a rectangular facet 20.

Figure 8:
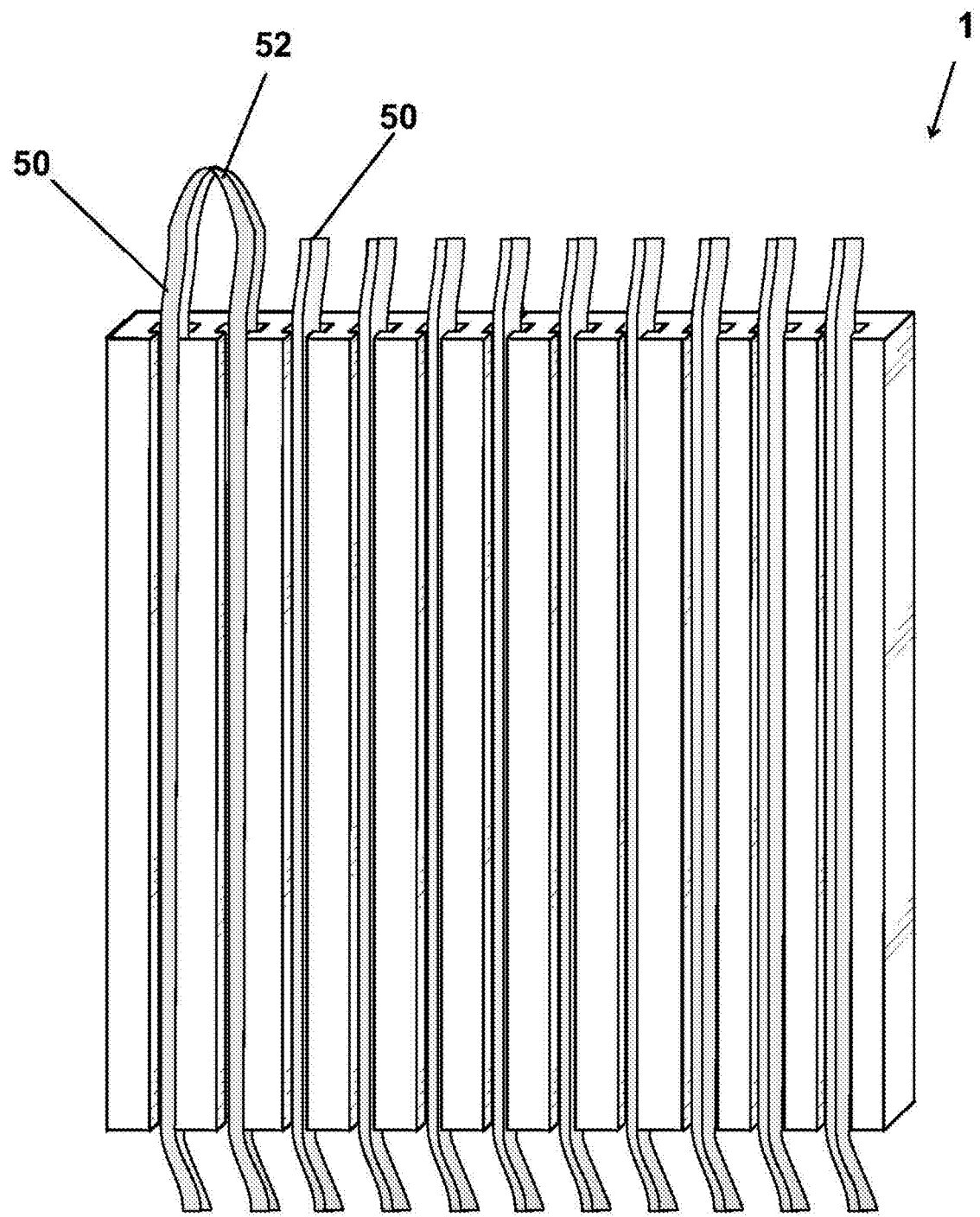
FIG. 8 is a perspective overhead frontal view of the cord organizer having T-Slot cord retainers that are filled with cords having a thick ribbon shape, wherein one of the cords is looped and is organized in two T-Slot cord retainers.

As show in FIG. 8 the cord organizer 1 has T-Slot cord retainers 23b, and each is filled with a sectional length of cord. In the embodiment the cord is an electrical cord 50 that has a thick ribbon shape, as is found commonly found on household appliances, less expensive barber clippers and DSL lines. The T-slot is effective as the rectangular chamber is similar in shape to thick ribbon shaped cords. Note, the cord organizer 1 can used to take up excess cord length by forming a loop 52. As illustrated in FIG. 8 the first and second cord retainers are filled with two sectional lengths of the same electrical cord 50. It is anticipated that the entire cord organizer 1 could be filled with one cord, and could be payed-out in sectional lengths plus the length of each loop.

Figure 9:
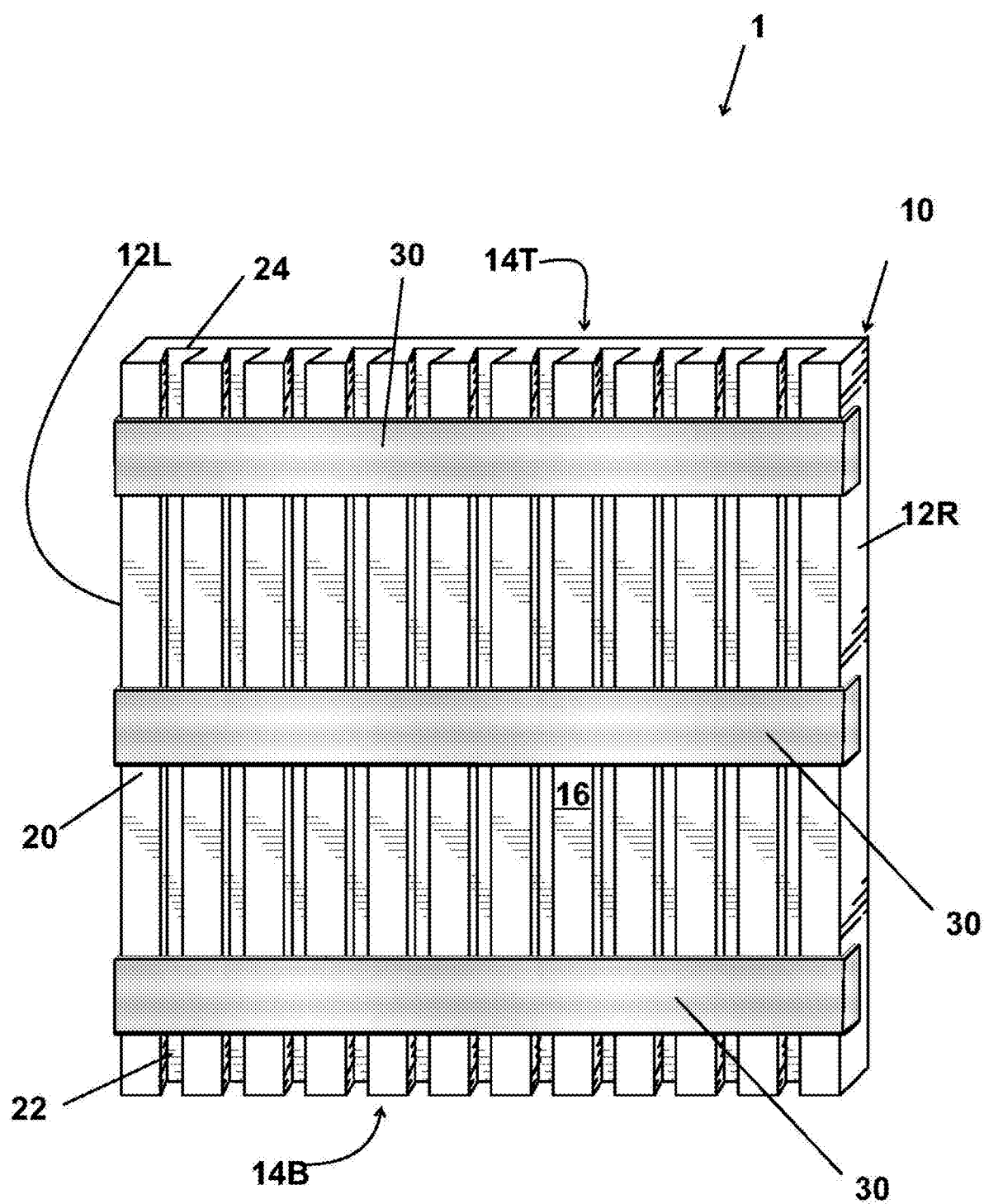
FIG. 9 is a perspective overhead frontal view of a cord organizer, wherein has each open-ended elongate slot is coextensive with an open-ended elongate trapezoidal chamber and function together as a dovetail cord retainer, wherein spanning the frontal surface is at least one elastic band.

In FIG. 9 the frontal surface 16 of the flexural board 10 has a plurality open-ended elongate slots coextensive with an open-ended trapezoidal chamber, wherein the combined slots and trapezoidal chamber form a dovetail cord retainer 22a that are separated by rectangular facets 20. In the illustrated embodiment there is at least one elastic band 30 that is spanning the frontal surface 16.

Figure 10:
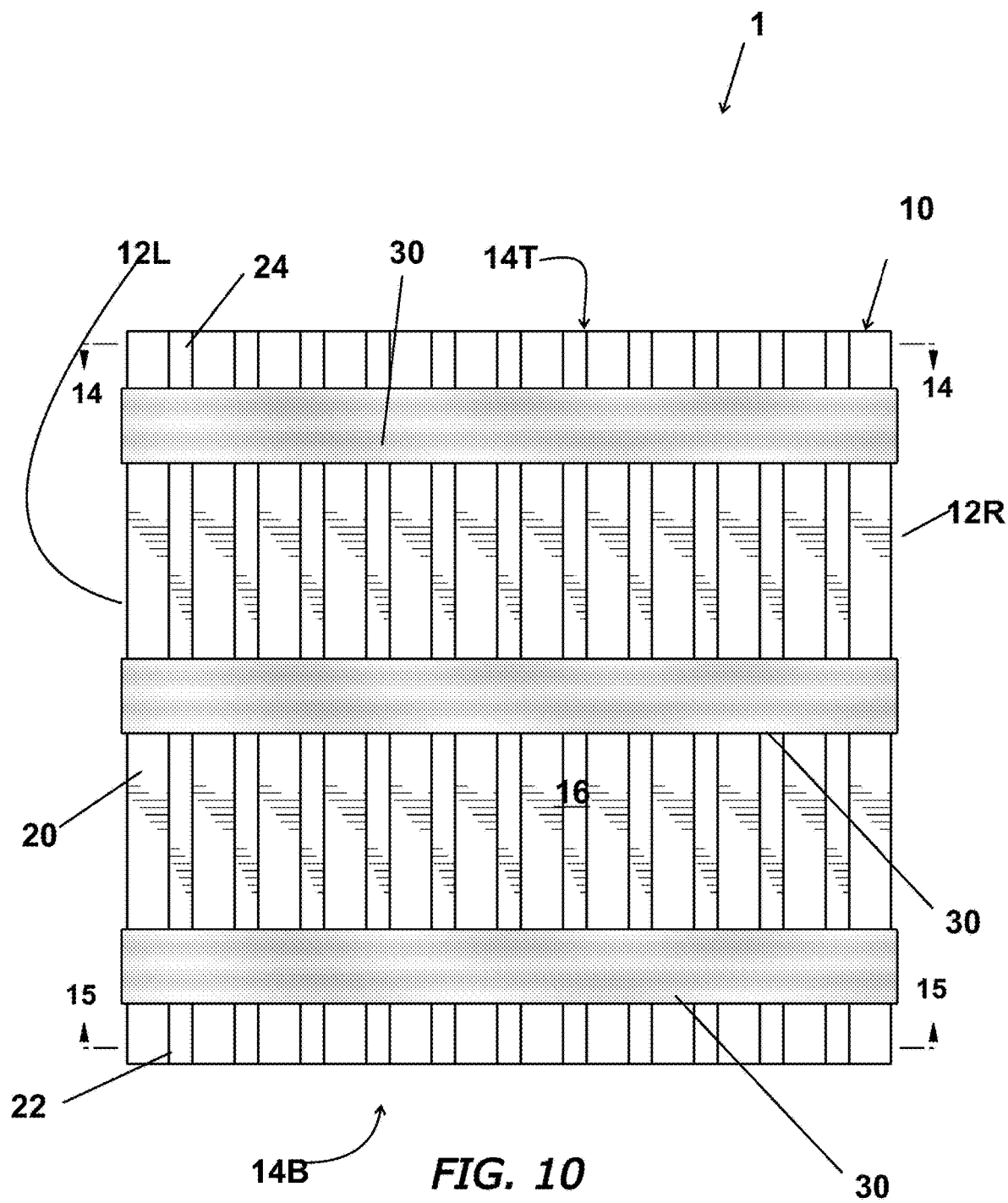
FIG. 10 is a plan overhead view of the front of the cord organizer shown in FIG. 9, illustrating a cross-sectional sectional line 14-14, and a cross-sectional sectional line 15-15.

As shown in FIG. 10, there are three elastic bands 30 shown in FIG. 9.

Figure 11:
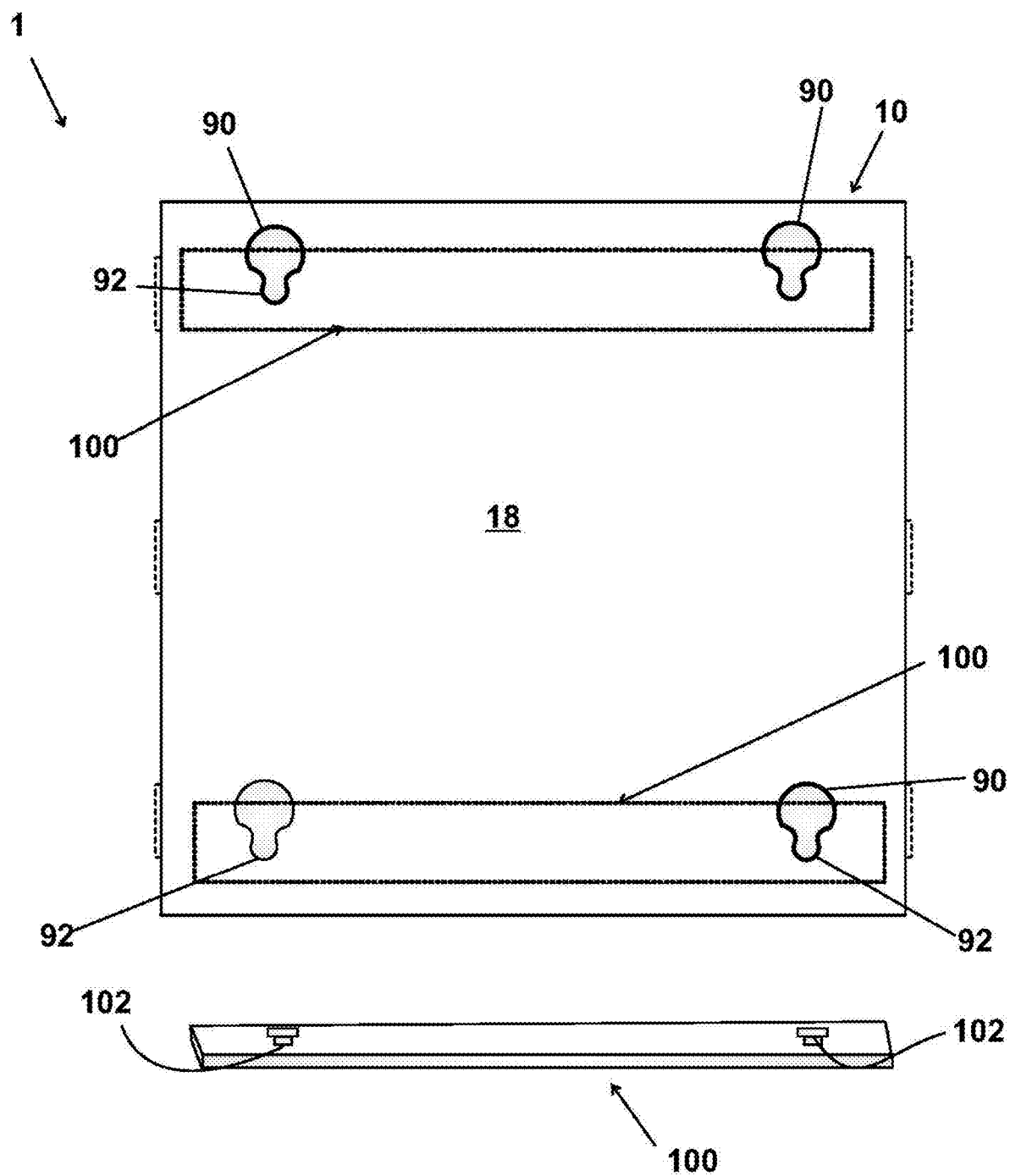
FIG. 11 is a plan overhead view of the back of the cord organizer illustrating the use of a detachable bracket having a projecting interlocking means that is coupled with a recessed interlocking means on the flexural board 10, wherein the coupling prevents the cord organizer from arcing backwards, therein augmenting the cord retainers.

The cord organizer can employ detachable brackets 100 on the back 18 to prevent accidental flexing and to provide additional support for the cord retainers. The detachable brackets 100 require little or no modification of the cord organizer 1 as is shown in FIG. 11. In an embodiment wherein there is a slight modification, the back 18 has a recessed interlocking means 92 with an alignment hole 90 on the flexural board 10. The detachable bracket 100 has a projecting interlocking means 102 that can be coupled with the recessed interlocking means 92. The coupling prevents the cord organizer 1 from arcing backwards, therein augmenting the cord retainers. In the illustrated embodiment there are two detachable brackets 100, but there could easily be one with four projecting interlocking means 102 and other combinations are anticipated. The edges of the elastic bands 30 shown in FIG. 10 are optional, and are shown in ghost by dashed lines.

Figures 12, 13:
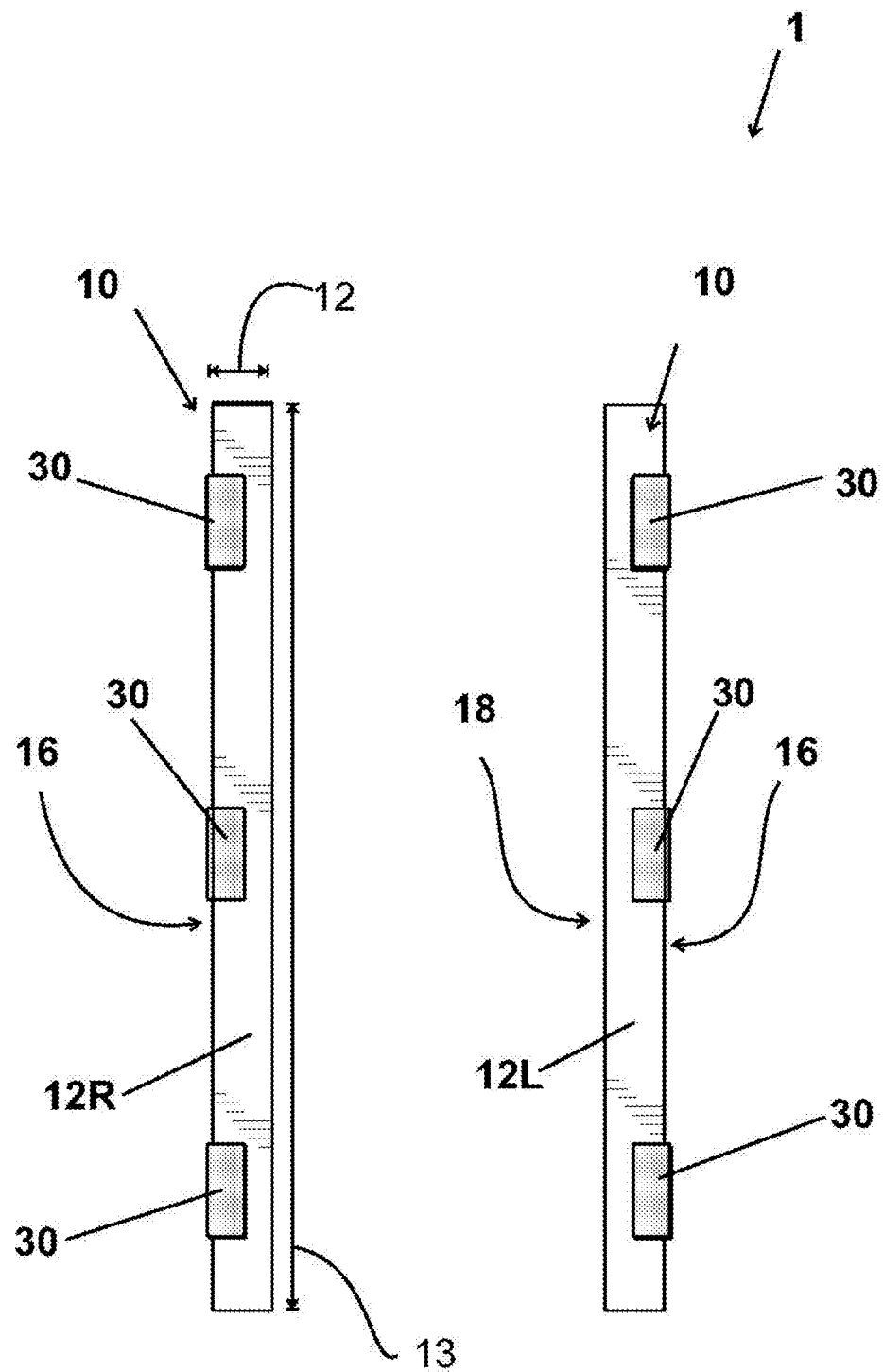
FIG. 12 and FIG. 13 illustrate opposing side edges of the of the cord organizer shown in FIG. 9, wherein the cord organizer has three elastic bands.

Alternatively, additional support can be provided as shown in FIG. 12 and FIG. 13 adding or increasing the tension of the elastic bands 30 to the front surface 16. Elastic bands also provide restrain relief to a cord if is pulled out of the cord retainer.

Figure 14:
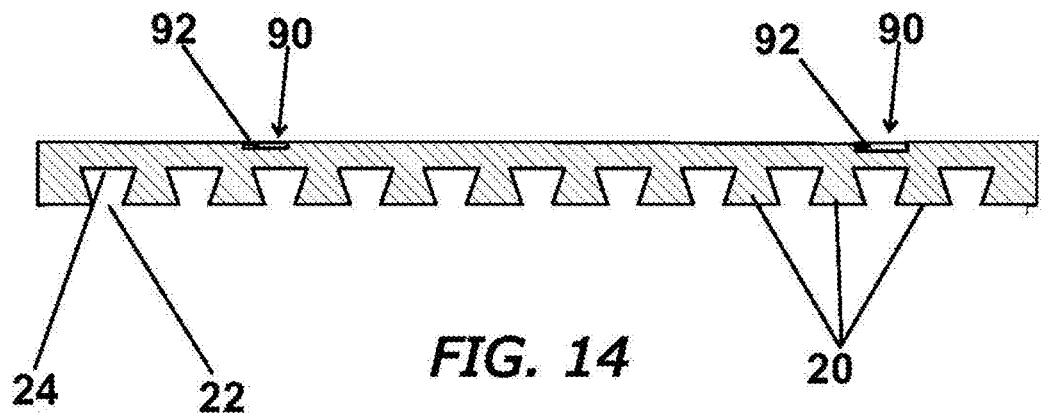
FIG. 14 illustrates a cross-sectional cut along sectional line 14-14 shown in FIG. 9 of the cord organizer, wherein the flexural board has a plurality of dovetail cord retainers separated by rectangular facets.
Figure 15:
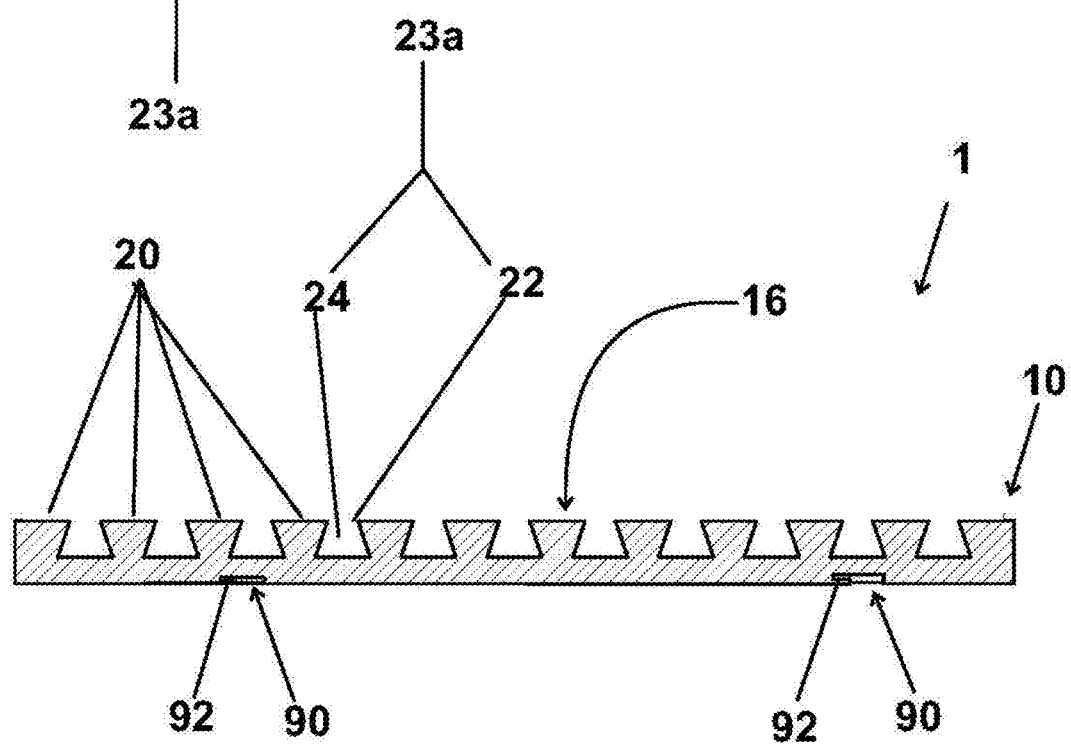
FIG. 15 illustrates a cross-sectional cut along sectional line 15-15 shown in FIG. 9 of the cord organizer, wherein the flexural board has a plurality of dovetail cord retainers separated by rectangular facets.

FIG. 14 and FIG. 15 illustrate cross-sections cut along sectional line 14-14 and sectional line 15-15. The cord organizer 1 has a plurality of dovetail cord retainers 23a separated by rectangular facets 20.

Figure 16:
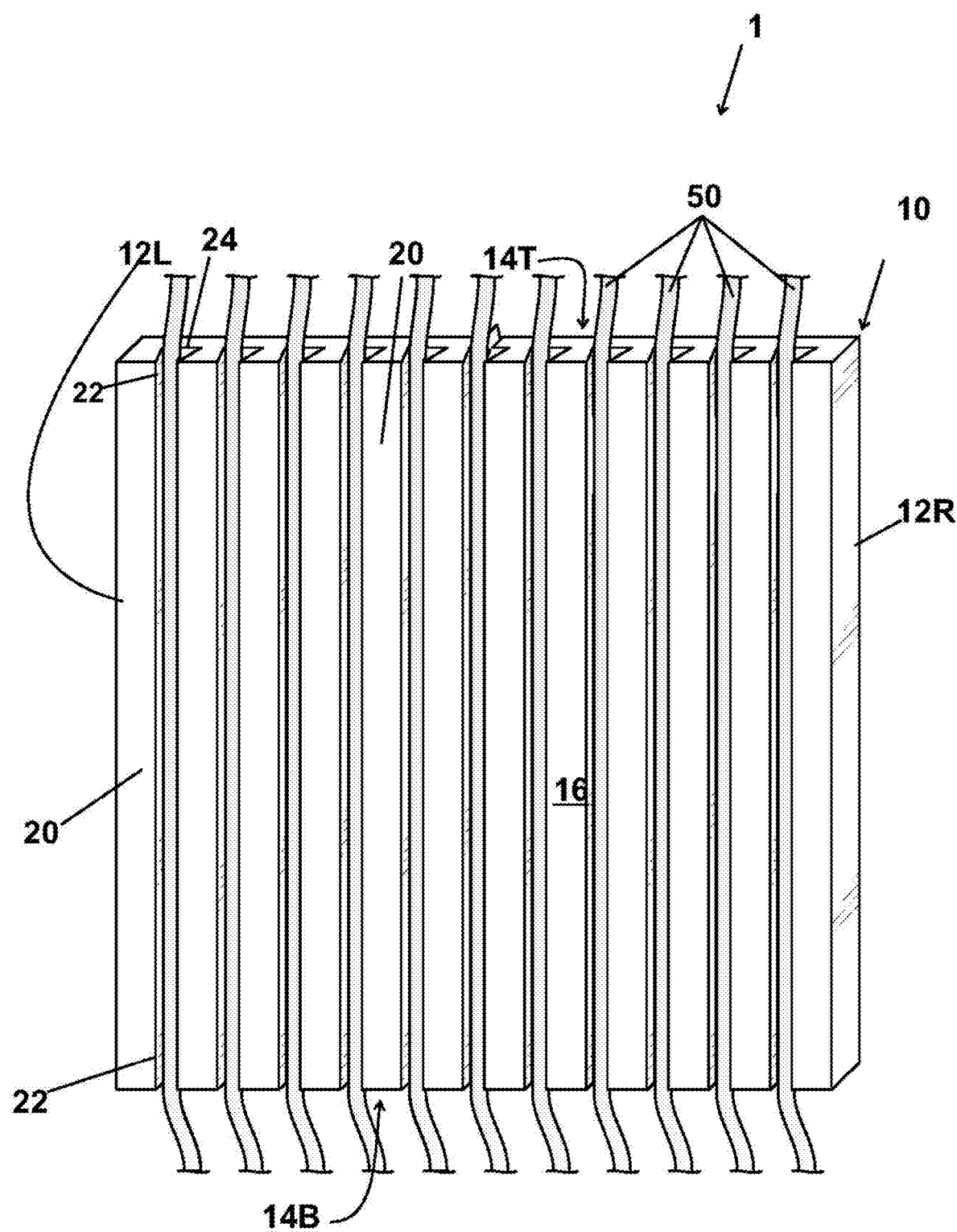
FIG. 16 is a perspective overhead frontal view of the cord organizer having dovetail cord retainers that are filled with cords having a round shape.

Dovetail cord retainers that are retaining round cords are shown in FIG. 16.

Figure 17:
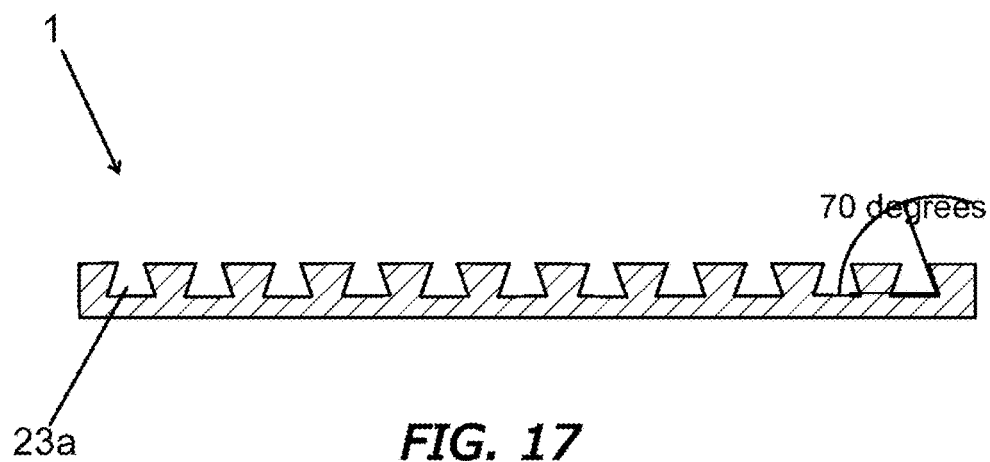
FIG. 17 illustrates the cross-sectional cut along sectional line 15-15 shown in FIG. 15, wherein the cord organizer is not flexed, and the side-walls of the plurality of dovetail cord retainers have an illustrated angle of 70 degrees with range of about 45 to about 80 degrees with respect to a base of the dovetail cord retainer.
Figure 18:
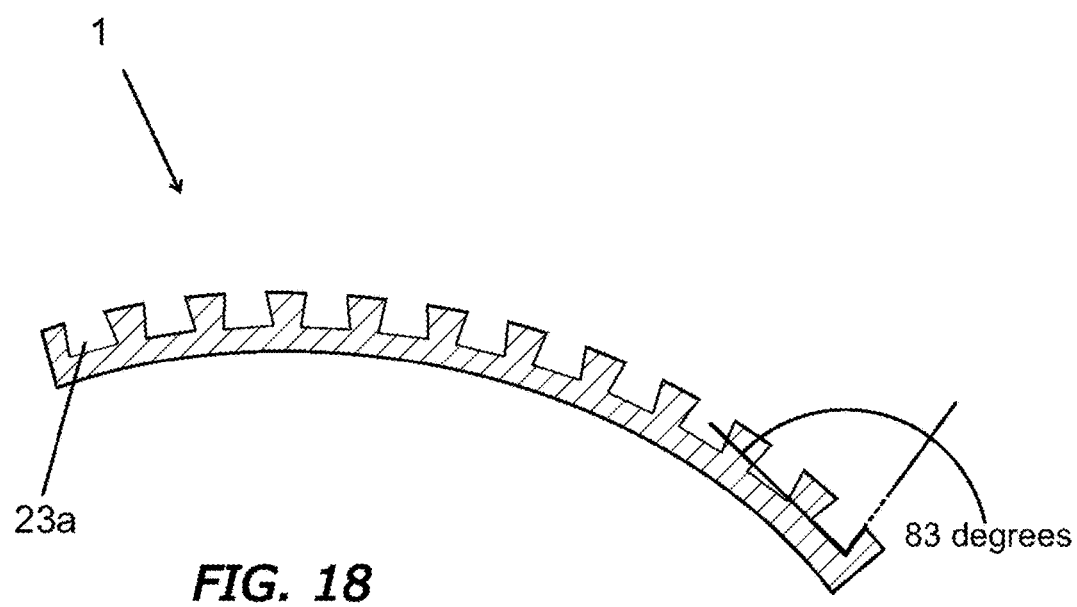
FIG. 18 illustrates the cross-section of the cord organizer shown in FIG. 15, wherein the cord organizer is flexed about 60 degrees, causing the rectangular facets to fan out and the walls of the plurality of dovetail cord retainers to pivot expanding the opening of the slot, wherein at a 60 degree arc, the walls have rotated out about 13 degrees, to over 80 degrees with respect to the base of each of the dovetail cord retainers.

The cord organizer is not flexed in FIG. 17, and walls of the plurality of dovetail cord retainers 23a have an illustrated angle of 70 degrees with a range of about 45 to about 80 degrees with respect to a base of the trapezoidal shaped open-ended elongate chamber. The cord organizer shown in FIG. 18 is flexed about 60 degrees, causing the rectangular facets 20 to fan out and the walls of the plurality of dovetail cord retainers to pivot expanding the opening slot, wherein at a 60 degree arc, the walls have rotated out about 13 degrees, to over 80 degrees with respect to the base of the trapezoidal shaped open-ended elongate chamber.

Figure 19:
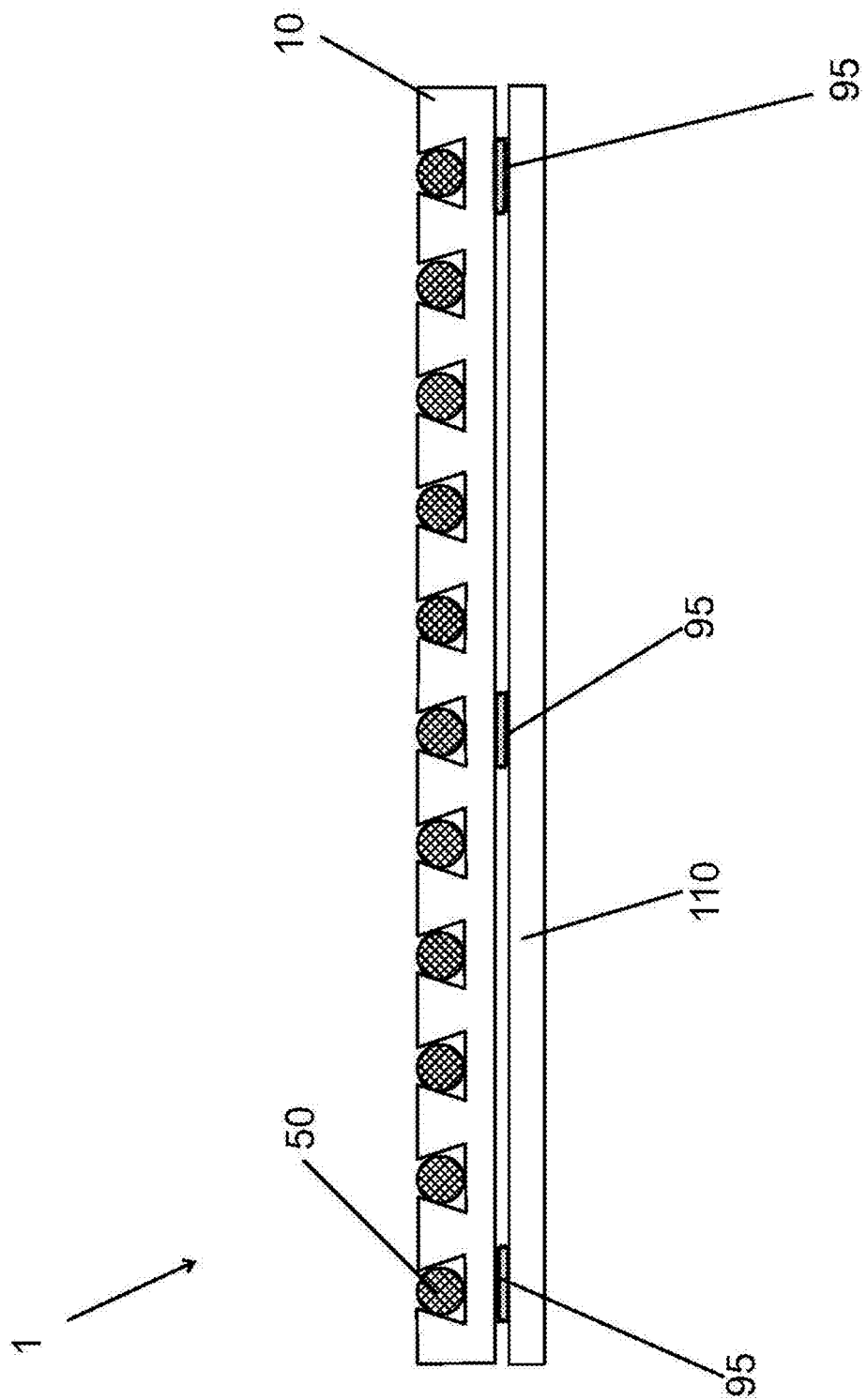
FIG. 19 is an end-on view illustrating the cord organizer mounted on a support element utilizing a fastening means for attaching the cord organizer to the support element, wherein the cord organizer cannot be flexed while it is fastened to the support element, wherein each of the eleven dovetail cord retainers is filled with a cord, and tall of the cords are tightly enclosed.

The cord organizer in FIG. 19 is mounted on a support element 110 is utilizing a fastening means 95 for attaching the cord organizer to the support element, wherein the cord organizer cannot be flexed while it is fastened to the support element, wherein each of the eleven dovetail cord retainers has been filled with a cord, therein organizing the cords.

The support element 110, including the detachable bracket 100, is selected from the group consisting of a rigid plastic base with a double sided pressure sensitive tape, a rigid plastic base with a hook and loop fastener system, a rigid plastic base with at least one fastening means that can slide into an opening on the back portion of the flexural board interlocking the flexural board to the rigid plastic base with the at least one fastening means, a metal plate with a double sided pressure sensitive tape, a metal plate with a hook and loop fastener system, a metal plate with at least one fastening means that can slide into an opening on the back portion of the flexural board interlocking the flexural board to the metal plate with the at least one fastening means, and a combination thereof.

Furthermore, the top edge 14T and the bottom edge 14B of the cord organizer can be fitted with a closing means to augment closure of the cord retainers, wherein a closing means is selected from the group consisting of staples, clips, cable ties, covers and combinations thereof.

FIG. 20a, FIG. 20b and FIG. 20c illustrate three different open-ended chambers and how their shape influences their capability to retain differently shaped cords. In FIG. 20a the elongate slot 22 is coextensive with an elongate chamber 24 that has a trapezoidal shape forming a dovetail cord retainer 23a having a cross-sectional dovetail shape. The cross-sectional dovetail shape is very effective for receiving and retaining round cords. Round cords are commonly used on professional barber clippers and many computer electronics. The dovetail cord retainer 23a is effective because it applies pressure orthogonally at three locations against the round cord 50 as shown in FIG. 19, therein enabling retention of a number of different sized round cords on the cord organizer 1.

As can be seen, when the cord organizer 1 is flexed about 60 degrees, the entrance widens significantly. This is because the rectangular facets 20 don't significantly change in shape, but the overall frontal surface 16 is extended about 16%, so the rectangular facets 20 fan out and the slots widen. In the illustrated embodiment the total length of the frontal surface increases from about 2.8 inches to about 3.2 inches. The increased length of about 0.4 inches is spread over five slots, so each slot increases in width about 0.08 inches. In the case of the dovetail cord retainer 23a, there is substantially no distinction between the walls 27a forming the slot and the walls of the trapezoidal shape, so that the pivot points 29a are the corners of the trapezoid. Flexing the cord organizer 1 not only improves access (widens the slot), it temporarily increases the total available cross-sectional area of each of the cord retainers.

FIG. 20b illustrates the cord organizer 1 with five T-Slot cord retainers 23b. The elongate slot 22 is coextensive with an elongate chamber 24 that has a rectangular shape forming a T-Slot cord retainer 23b with a cross-sectional T-Slot shape. The T-Slot cord retainer 23b is useful for securing a thick ribbon shaped cord. As previously taught thick ribbon shaped cords are commonly found on household appliances, less expensive barber clippers and DSL lines, and the ribbon shaped cord are effectively in the horizontal rectangular chamber of the T-Slot cord retainer.

When the cord organizer 1 with T-Slot cord retainers 23b is flexed the rectangular facets 20 fan out and the width of the slots increases, but not as much as with the dovetail cord retainer, because there are more pivot points as shown in FIG. 20b. Pivot point 29b will flex, but less so because pivot points 29b' and 29b" also deflect, wherein pivot point 29b'" becomes more acute to compensate for the deflection of pivot point 29b'. The net result is less widening of the slot, and less increase in the total available cross-sectional area than was attained by the dovetail cord retainer 23a. The larger horizontal chamber will still be a better fit for many ribbon shaped cords.

FIG. 20c illustrates the cord organizer 1 with five keyhole cord retainers 23c. The elongate slot 22 is coextensive with a circular elongate chamber 24 forming a keyhole cord retainer 23c having a cross-sectional keyhole shape. As shown in the drawing the keyhole cord retainer 23c has only one significant pivot point 29c, so the width of a slot of the keyhole cord retainer 23c will be significantly widened. The total available cross-sectional area increases as the keyhole becomes more oval as the slot widens.

The cord organizer 1 utilizing keyhole cord retainers 23c is particularly suited for organizing heavily twisted ribbon cords and heavily twisted round cords, as well as untwisted round cords. Because of its round shape and single pivot point, the flexural board often has a slightly greater thickness. As with all of the cord organizers, the rectangular facets 20 fan out, remaining substantially unchanged (not deformed), when the flexural board 10 is flexed backwards.

The flexural board is typically composed of a stiff yet resilient rubbery material, having a Durometer greater than D10. It is preferably substantially a dielectric, with little affinity for moisture.

An example of a suitable material is a polyvinyl chloride, wherein the flexural board has a flexural strength of about 2900 psi±about 500 psi (Test D790), a tensile percent elongation at break of about 15%±about 5% (Test D638), and a Durometer hardness of Hardness of about D55±about 10 (Test D785). The flexural board has good electrical resistance at even moderately high relative humidity (RH), wherein the volume resistivity at 50% RH is greater than 10^16 ohm-cm (Test D257).

From the foregoing it is apparent that the cord organizer is durable, and resistant to chemicals used by a barber/stylist, as similar materials are commonly used in for chemical containers.

The cord organizer can be combined with another cord organizer, and can be used on the floor, in a cabinet or on a wall, and oriented either horizontally or vertically.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A cord organizer, wherein said cord organizer comprises a flexural board with a Durometer hardness of about D55±about 10 (Test D785) that under force can be flexed from flat to arced, wherein the flexural board comprises a back portion, a front portion, a thickness, a width with a top edge and a bottom edge, and a length with a left edge and a right edge; wherein nominally the flexural board is about flat and the front portion has a frontal surface with a plurality of facets that are about rectangular, wherein the facets are separated by slots that are open-ended and elongate and extend from the top edge to the bottom edge of the flexural board; wherein each slot is coextensive with an open-ended elongate chamber, wherein each of a plurality of open-ended elongate chambers has a dovetail cross-section and is recessed within the thickness of the flexural board, wherein each slot is combined and coextensive with one open-ended elongate chamber therein comprising a dovetail cord retainer; wherein, when the left edge and/or the right edge of the flexural board is angularly flexed from a relaxed state, the facets fan out and, consequentially, the slots are widened lengthwise thereby enabling access to the open-ended elongate chambers of the dovetail cord retainers; and while fanned out, the dovetail cord retainers can be fitted with one or more sectional lengths of a cord; and wherein, when the flexural board is no longer angularly flexed, it returns to the relaxed state, wherein the dovetail cord retainers envelop and restrain cords fitted on the cord organizer.

2. The cord organizer according to claim 1, wherein all of the dovetail cord retainers are parallel with respect to each other and parallel to the left edge and the right edge.

3. The cord organizer according to claim 1, wherein the front portion has a lengthwise tensioned elastic band that provides greater flexural resistance to being angularly flexed, and also provides strain relief to a loose cord that has been partially or fully dislodged from one of the dovetail cord retainers.

4. The cord organizer according to claim 1, wherein the back portion of the flexural board is reversibly mounted to a support element, which prevents the flexural board from being angularly flexed while attached to the support element.

5. The cord organizer according to claim 1, wherein the dovetail cord retainer is with the cross-sectional dovetail shape provides pressure orthogonally at three locations against a round cord, and the cord retainer will widen at an upper most surface of the slot when the flexural board is arced therein providing greater widening, and a capability to secure a range of sizes of cords on the cord organizer.

6. The cord organizer according to claim 1, wherein the flexural board is comprised of a polyvinyl chloride based material.

7. The cord organizer according to claim 1, wherein the flexural board has a flexural strength of about 2900 psi (Test D790)±about 500 psi, and a tensile percent elongation at break at about 15%±about 5% (Test D638).

8. The cord organizer according to claim 1, wherein the flexural board has a volume resistivity at 50% Relative Humidity that is greater than 10^16 ohm-cm (Test D257).

9. The cord organizer according to claim 1, wherein the cord organizer has a length of 10 inches has at least about 22±about 11 cord retainers.

10. The cord organizer according to claim 1, wherein the top edge and the bottom edge of the cord organizer has a closing means to augment closure of the cord retainers, wherein a closing means is selected from the group consisting of staples, clips, cable ties, covers and combinations thereof.

11. The cord organizer according to claim 1, wherein the cord organizer is durable, and resistant to chemicals used by a barber/stylist.

12. A cord organizer, wherein said cord organizer comprises a flexural board having a Durometer hardness of Hardness of about D55±about 10 (Test D785) with a back portion, a front portion, a thickness of about ¼ inch to ¾ inch; wherein the back portion is about flat and the front portion has a frontal surface with rectangular facets separated by open-ended elongate slots, wherein each open-ended elongate slot extends the width of the flexural board from the top edge to the bottom edge, and each open-ended elongate slot is coextensive with an open-ended elongate chamber with a dovetail cross-section, said open-ended elongate chamber recessed within the thickness, where a combined open-ended elongate slot and coextensive open-ended elongate chamber form a cord retainer; wherein, when the flexural board is angularly flexed from a relaxed state the left edge and the right edge is arced towards the back portion, the rectangular facets fan out and widen the open-ended elongate slots of the cord retainers; and while fanned out the cord retainers can be fitted with one or more sectional length(s) of a cord, wherein each sectional length is nominally at least as long as the elongate chamber of the cord retainer; and wherein, when the flexural board is no longer flexed, the flexural board returns to the relaxed state, wherein the cord retainers envelop and restrain each of the cords fitted on the cord organizer.

\* \* \* \* \*